United States Patent [19]

Barratt

[11] Patent Number: 5,442,770
[45] Date of Patent: Aug. 15, 1995

[54] TRIPLE PORT CACHE MEMORY

[75] Inventor: Peter G. Barratt, Wellesley, Mass.

[73] Assignee: NEC Electronics, Inc., Mountain View, Calif.

[21] Appl. No.: 76,286

[22] Filed: Jun. 11, 1993

Related U.S. Application Data

[63] Continuation of Ser. No. 301,404, Jan. 24, 1989, abandoned.

[51] Int. Cl.⁶ .................................... G06F 12/00
[52] U.S. Cl. .......................... 395/403; 365/230.03; 365/230.05; 364/DIG. 1; 364/243.6; 364/247; 364/243; 364/251; 364/251.3; 395/444
[58] Field of Search ............ 365/230.03, 230.05, 365/230.09, 221, 189.04; 395/400, 425

[56] References Cited

U.S. PATENT DOCUMENTS

| | | | |
|---|---|---|---|
| 3,654,621 | 4/1972 | Bock et al. | 395/800 |
| 3,739,352 | 6/1973 | Packard | 395/425 |
| 3,740,728 | 6/1973 | Pallen | 395/275 |
| 4,541,075 | 9/1985 | Dill et al. | 365/230.05 |
| 4,757,477 | 7/1988 | Nagayama et al. | 365/230.05 |
| 4,825,411 | 4/1989 | Hamano | 365/189.04 |
| 4,845,664 | 7/1989 | Aichelmann, Jr. et al. | 364/900 |
| 4,855,957 | 8/1989 | Nagami | 365/230.03 |
| 4,891,794 | 1/1990 | Hush et al. | 365/230.05 |
| 4,891,795 | 1/1990 | Pinkham et al. | 365/230.05 |
| 4,897,818 | 1/1990 | Redwine et al. | 365/221 |
| 4,899,316 | 2/1990 | Nagami | 365/221 |

Primary Examiner—Rebecca L. Rudolph
Attorney, Agent, or Firm—Skjerven, Morrill, MacPherson, Franklin & Friel; Edward C. Kwok

[57] ABSTRACT

Cache memory input/output apparatus that allows transfer of a single data word and transfer of consecutive sequences of data words in a row of memory, using two independent serial ports and a random access port whose actions are controlled in part by a memory address signal. Data transferred by the serial ports are double buffered, each serial port having two independent registers; and the two registers associated with a serial port may be ganged together to transfer data sequences having word lengths from 16, or multiples thereof, up to arbitrary multiples of the length of a row of data words.

10 Claims, 1 Drawing Sheet

TRIPLE PORT CACHE MEMORY

This application is a continuation of application Ser. No. 07/301,404, filed Jan. 24, 1989 now abandoned.

FIELD OF THE INVENTION

This invention relates to input/output apparatus for transferring data into or out of cache memory in a computer.

BACKGROUND OF THE INVENTION

Use of a random access memory input/output ("I/O") device for cache memory is well known in the art. Such devices are limited in their available array bandwidths by their use of a single I/O port. Some video memory devices provide a second (serial) port that is useful for transferring data serially into and out of the memory cells of the memory. However, this serial port is constrained to handle only sequences of data of length up to some predetermined number, such as 128 or 256, and from consecutive memory cells in a row or column of the cache. Further, the maximum number of cells that may be read out sequentially at a maximum rate from such a port is one row, such as 512 or 1,024 consecutive memory cells. These video memories are designed for video displays and are not particularly useful for other applications; they do not provide for internal byte counting or continuous transfers of indeterminate length. It would be useful if a serial port would allow transfer in and out of the contents of sequences of consecutive memory cells of smaller lengths, as low as 16 cells, and of larger lengths such as 2,048 cells.

The Texas Instrument TMS4461 multiport video RAM provides a random access port and a single serial port for data transfer into and out of a RAM memory, but the serial data word length appears to be limited to a single value, 256 consecutive words. Similarly, the NEC $\mu$PD41264 memory provides a random access port and a single $\times 4$ serial port for data transfer, and serial data length is limited to the single value of 256, representing one fourth of the length of one row in a memory matrix. Because the output is $\times 4$, the length of one row is $256 \times 4 = 1024$.

SUMMARY OF THE INVENTION

The subject invention provides the capability of transferring data into or out from a cache memory in consecutive sequences of length small as 16 and as large as an arbitrary integer multiple of 1,024, using two serial memory ports that may operate synchronously or asynchronously, as the operator prefers, plus a random access memory port.

Other objects of the invention, and advantages thereof, will become clear by reference to the detailed description and the accompanying drawings.

These objects may be achieved in accordance with the invention by apparatus that includes: a cache memory having data words arranged in rows and columns; address input means to specify which data word or sequence of data words are to be transferred to or from cache memory; a random access port to allow transfer of individual data words; and two serial ports to allow independent transfers of sequences of data words between cache memory and an external source. The invention also includes control signal means to specify whether the random access port or one of the serial ports is to be used for transfer of the data word or words, and to further specify the length and location of any sequence of data words to be transferred through the first and/or second serial port and whether a data word or sequence of data words is to be written into or read from the cache memory.

DETAILED DESCRIPTION

Figure 1:
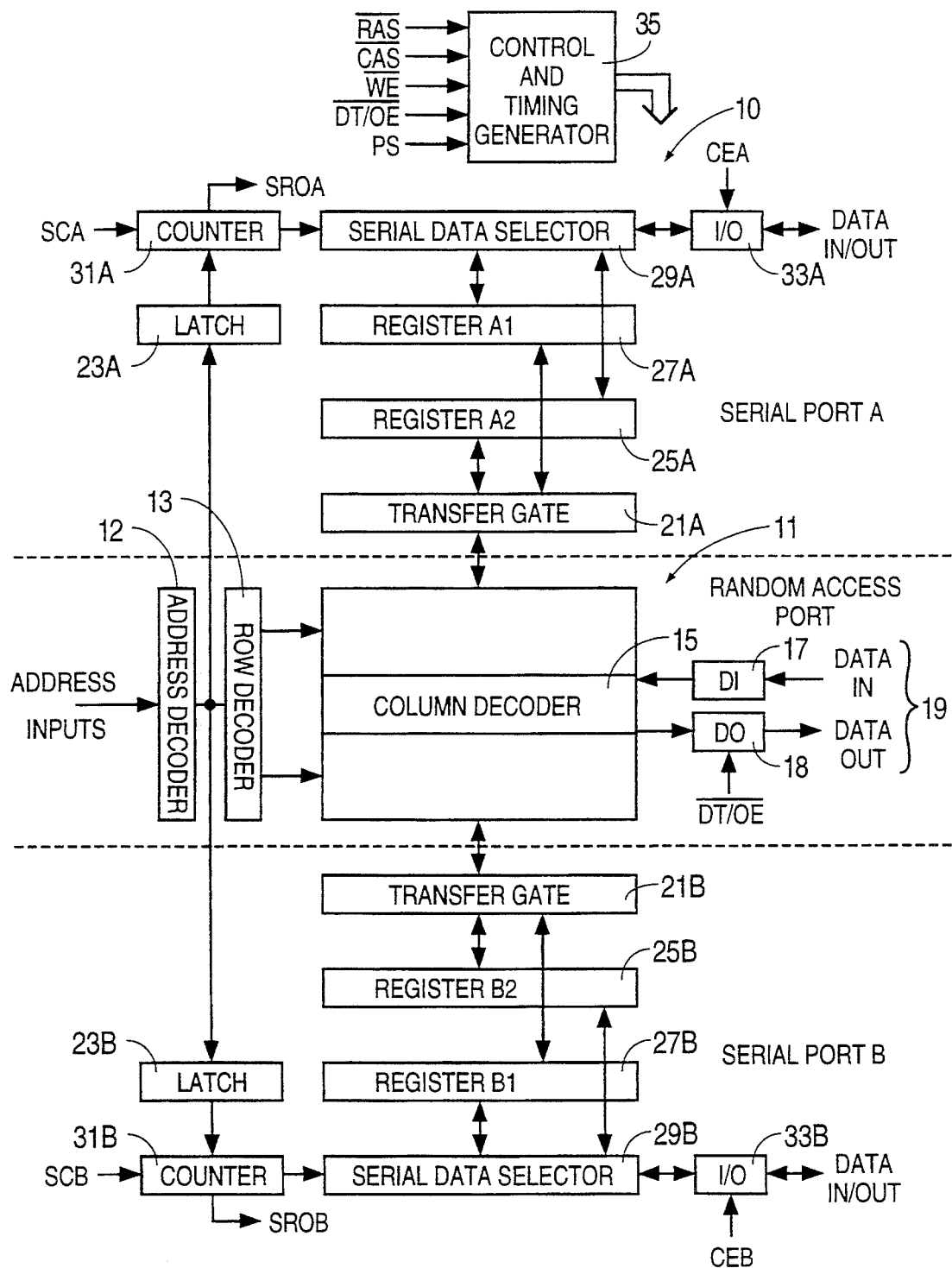
FIG. 1 is a schematic view of one embodiment of the invention, showing a random access port and two doubly-buffered serial ports that may operate independently of one another.

FIG. 1 illustrates one embodiment of the invention. A cache memory 11 receives address input signals through an address buffer 12, and the addresses are decoded by a row decoder 13 and by a column decoder 15 for specification of the address for which data are to be transferred through a random access port 19. For definiteness, it is assumed here that the cache memory size is substantially $1,024 \times 1,024$, although cache memory is unlimited in a general embodiment of the invention. An address input signal with ten bits, denoted RAS, determine the row in cache memory corresponding to the word or first word to be transferred. As soon as the RAS signal specifies the row, all words contained in that row are refreshed. Transfer of a data word through the random access port requires that the data be written into the cache memory from an external source through a data-in sub-port 17 of the random access port 19 and/or that data be read out of the cache memory to an external source through a data-out sub-port 18 of the random access port 19. If the random access port is to be used for data transfer, another address input signal with ten additional bits, denoted CAS, specifies the column of the target memory cell, and the intersection of the row and column prescriptions determines the memory cell for which data transfer is desired. The bits of the RAS and CAS signals are clocked into memory on the falling edge of the RAS and CAS signals, respectively.

Where serial transfer of data out through a serial port is called for, the row specified by the ten bits of the RAS signal is transferred to one of two registers associated with that serial port. The first three bits (b0, b1, b2) of the ten-bit CAS signal specify the size of the serial (data) block to be transferred; the value of the fourth bit (b3) on a falling edge of the CAS signal specifies which of the two registers is to be used; and the remaining six bits (b4–b9) specify the location of the first element of the block that is to be transferred in the chosen row. With six bits available to specify location of a first element in a block, the number of distinct block locations that may be specified is $2^6 = 64$; each block in a row consists of 16 consecutive memory cells in that row and $16 \times 64 = 1,024$, which is the number of elements in a row here. If a row has $2^{10} = 1024$ cells, a choice of block size of $2^m$ (m=4,5,6,7,8,9 or 10) will produce $2^{10-m}$ block of that size in that row. More generally, let $2^{M1}$ = number of cells in a row, $2^{M2}$ = actual block size that is specified by the CAS bits, $2^{M3}$ = number of blocks of that size within a row, where M1, M2 and M3 are non-negative integers; these integers must satisfy the constraint $$M1 = M2 + M3$$

For the particular example above, M1=10, M2=4, M3=6.

The apparatus also has two serial ports, A and B, each of which can transfer data in consecutive sequences of lengths such as 16, 32, 64, 128, 256, 512 or 1,024 words, or some subset thereof, depending on the values of three block size bits ($b_0$, $b_1$, $b_2$) that are part of the column address prescription CAS signal where one of the serial ports is to be used. The number of bits used for block size prescription in serial data transfer may be two or more, but three block size bits is a preferred choice. Serial port A may include a transfer gate 21A to transfer a sequence of row data into or out of the cache memory 11 through the port input/output component, a latch 23A for timing and flow control purposes, two serial data double buffering registers 25A and 27A, each of which can receive a row of data from the transfer gate 21A, a serial data selector module 29A that selects the memory cells whose contents are transferred in or out through the registers 25A and 27A, a counter 31A that monitors the length of the sequence read in or out, in order to prevent overwrite of data in cache memory that are not to be affected by the transfer, and an I/O component 33A for actual transfer of the data to or from an external source.

The serial port B is similarly constructed, as shown in FIG. 1, and also requires three bits to prescribe block size, one bit to prescribe the register (25B or 27B), and six bits to prescribe the block location on the chosen row. The serial ports A and B are each double buffered using two data registers each so that a data stream may consist of, for example, a stream of words passing through register 27A, immediately followed by a stream of words passing through register 25A, followed by another stream of words passing through register 27A. This allows a many-fold increase in the number of choices for length of the data stream, at a cost of provision of one bit in the column address input signal. Use of double buffering by incorporation of two registers in each serial port allows concatenation of a data stream sequence to transfer arbitrarily large multiples of 16, 32, 64, 128, 256, 512 or 1,024 bits or bytes in a single sequence through one of the serial ports.

The two serial ports A and B may be operated independently and asynchronously so that two independent word streams may be transferred through the serial ports A and B. Serial port A and serial port B may be independently enabled for a read operation or for a write operation, or both ports may be used for read or for write operations for independent data transfer. The two serial ports A and B alternate in time, if two groups of serial data are being transferred into or out of cache memory 11 substantially simultaneously.

Where serial transfer of data is to be made using serial port A or B or both, the RAS signal and the CAS signal together specify the row in cache memory 11, the block size, the location of the block in that row, and the register to be used for the data transfer. For a read out operation using one of the registers associated with a serial port, the address of the first cell to be read out of the register is the first address in the block specified by part of the CAS signal, in the row specified by the RAS signal. Use of the block location (first address) and block size in a write operation to cache memory 11 allows one to avoid overwriting cache memory contents that are not to be affected by such a transfer. A port select signal PS specifies which of the serial ports, A or B, is to be used; and a mode select signal DT/OE specifies whether the random access port or an undesignated serial port is to be used for the next data transfer (for example, low for serial data transfer). A write enable signal WE, issued externally, controls the direction of serial data transfer (for example, high for writing to cache memory 11 from an external source). The signals RAS, CAS, WE, DT/OE and PS are generated externally and delivered to a control and timing signal generator module 35, as shown in FIG. 1, for use in the cache memory apparatus 10.

The random access port 19 may have an associated cycle time of the order of 120 nsec., and the serial ports may each have a shorter cycle time, of the order of 80 nsec. Using doubly-buffered serial ports for data transfer, the apparatus allows the use of DRAM and does not require the use of more expensive high speed SRAM and allows use of a shorter cycle time for such transfer.

Although the preferred embodiment of the invention has been shown and described herein, variation and modification may be made without departing from the scope of the invention.

I claim:

1. A triple-port cache memory, comprising:
   an array of memory cells arranged in rows and columns;
   a random access port for accessing a selected memory cell;
   first and second serial ports for accessing in a bit-serial fashion a specified block of memory cells within a selected row of memory cells;
   means for specifying which one of said random access port and said first and second serial ports is accessed;
   an address decoding circuit, coupled to said array of memory cells, receiving a row address and a column address, said address decoding circuit decoding (i) said row address to select said selected row of memory cells, and (ii) said column address to select (a) selected memory cell from said selected row of memory cells, when said random access port is specified, and (b) said specified block of memory cells within said selected row of memory cells, when one of said first and second serial ports is specified, said column address including two fields specifying the size of said specified block, and the beginning position of said specified block within said row of memory cells, said address decoding circuit including, for each of said first and second serial ports, a counter for monitoring the size of data transferred between said selected row of memory cells and said specified one of said first and second serial ports.

2. A triple-port cache memory as in claim 1, wherein said first and second serial port each include a block selection circuit for writing said specified block within said selected row of memory cells without overwriting memory cells outside of said specified block of memory cells.

3. A triple-port cache memory as in claim 1, wherein each of said first and second serial ports receives, for each access specifying said serial port, the content of said selected row of memory cells, said serial port including first and second registers configured for double-buffering contents of selected rows of memory cells in successive accesses.

4. A triple-port cache memory as in claim 3, wherein said column address has a third field for specifying which of said first and second registers is used for holding the content of said selected row.

5. Cache memory apparatus for transferring a data word or sequence of data words into a cache memory from an external source or out of a cache memory into an external source, the apparatus comprising:

a cache memory arranged into rows and columns of memory cells, each of which can store a data word, the cache memory having an address input port, a random access data input/output port and two or more serial data transfer input/output ports;

address input signal means connected to the address input port to produce and deliver to the cache memory an address signal that specifies a memory cell whose content is to be transferred or changed, or a row, a size and a location of a consecutive sequence or block of memory cells in that row whose contents are to be transferred or changed, wherein the size specifies the number of memory cells to be transferred or changed, and the location specifies independently of the size the position of the first memory cell in the consecutive sequence or block of memory cells; and port selection/operation means connected to the serial data transfer input/output ports, the random access data input/output port, and to the address input signal means for (i) transferring data between the memory cell whose content is to be transferred or changed and the random access data input/output port, and (ii) transferring data between one of the serial data transfer input/output ports and the consecutive sequence or block of memory cells in the row specified by the address signal, wherein the port selection/operation means including, for each of the serial ports, (a) a first register for holding data received from, or to be transferred to the row in the cache memory specified by the address signal, (b) a serial data selector for transferring between the first register and the serial data transfer input/output port only the data specified by size and position in the address signal, and (c) a counter, connected to the address input signal means and the serial data selector, for monitoring the size of data transferred.

6. Cache memory apparatus as in claim 5, further comprising:

control signal means connected to the cache memory, to the random access data input/output port, to a control signal terminal of each of the serial ports, to generate control signals that determine which one of the random access port and the serial ports is to be used for transfer of a data word or a sequence of data words and to determine whether the data word or data words to be transferred are to be written into the cache memory or are to be read from the cache memory.

7. Apparatus according to claim 6, wherein for each of the serial data transfer input/output ports, the port selection/operation means has a second register, each of the first and the second registers having a length substantially equal to the number of memory cells in a row of such memory cells, and the address signal received further determines whether the first or the second register will be used for such transfer.

8. Apparatus according to claim 7 wherein each row of said cache memory contains $2^{N1}$ memory cells and the length of said sequence or block of memory cells is a power of two between $2^{N2}$ and $2^{N3}$, inclusive, where N1, N2 and N3 are non-negative integers, N2 is less than N3 and N3 is not greater than N1.

9. Apparatus according to claim 8, wherein N1=10, N2=4 and N3=10.

10. Cache memory apparatus for transferring a data word or sequence of data words into a cache memory from an external source or out of a cache memory to an external source, the apparatus comprising:

a cache memory arranged into rows and columns of memory cells, each of which storing a data word, the cache memory having an address input terminal, a random access data input/output terminal, and two or more serial data transfer input/output terminals;

address input signal means connected to the cache memory to produce and deliver to the cache memory an address signal that specifies a memory cell whose content is to be transferred or changed, or a size and a location of a consecutive sequence of addresses in a row whose contents are to be transferred or changed, wherein the size specifies the number of memory cells to be transferred or changed, and the location specifies independently of the size the position of the first memory cell in the consecutive sequence or block of memory cells;

a random access memory port connected to the address input means that causes data to be written into the cache memory from an external source and causes data to be read from an external source into the cache memory, one data word at a time;

first serial port means and second serial port means each connected to the address input signal means and having first and second control signal terminals, respectively, and being connected to the first and second serial data transfer input/output terminals, respectively, to cause transfer of a sequence of data words from cache memory to an external source and from an external source to cache memory, in a size and at consecutive memory cell locations specified by the address signal;

control signal means connected to the cache memory, to the random access memory port, to the first control signal terminal of the first serial port means, and to the second control signal terminal of the second serial port means, to generate control signals that determine whether the random access port, the first serial port means or the second serial port means is to be used for transfer of a data word or a sequence of data words and to determine whether the data word or data words to be transferred are to be written into the cache memory or are to be read from the cache memory;

wherein said first serial port means has first and second independent input/output registers, each of length substantially equal to the number of memory cells in a row of such cells, and said address signal received at said first serial port means determines the consecutive locations, in a row of cells, of a sequence of data words to be transferred through said first serial port means and determines whether the first or the second register will be used for such transfer; and said second serial port means has first and second independent input/output registers, each of length substantially equal to the number of memory cells in a row of such cells, and said address signal received at said second serial port means determines the consecutive locations, in a row of cells, of a sequence of data words to be transferred through said second serial port means and determines whether the first or the second register will be used for such transfer; and wherein each of said first and second serial port means further comprises:

an I/O component for transferring said sequence of data words to or from said external source;

a serial data selector, coupled to said I/O component and said input/output registers, for selecting said sequence of data words from said row; and a counter, coupled to said address input signal means and said serial data selector, for maintaining a count so as to monitor the number of words transferred between said serial data selector and said I/O component, and providing a control signal when said count equals the length of said sequence of data words as specified by said address signal.

* * * * *